(12) United States Patent
Yamaura et al.

(10) Patent No.: US 6,824,908 B2
(45) Date of Patent: Nov. 30, 2004

(54) FUEL CELL

(75) Inventors: Kiyoshi Yamaura, Kanagawa (JP); Minehisa Imazato, Tokyo (JP); Nobuaki Sato, Kanagawa (JP)

(73) Assignee: Sony Corporation, Tokyo (JP)

( * ) Notice: Subject to any disclaimer, the term of this patent is extended or adjusted under 35 U.S.C. 154(b) by 385 days.

(21) Appl. No.: 09/967,215

(22) Filed: Sep. 28, 2001

(65) Prior Publication Data

US 2002/0106552 A1 Aug. 8, 2002

(30) Foreign Application Priority Data

Sep. 29, 2000 (JP) ..................................... P2000-301411

(51) Int. Cl.$^7$ ................................................ H01M 8/10
(52) U.S. Cl. .............................. 429/33; 429/40; 429/41; 429/44
(58) Field of Search .............................. 429/33, 40, 41, 429/44

(56) References Cited

U.S. PATENT DOCUMENTS

| | | | | |
|---|---|---|---|---|
| 5,350,643 A | * | 9/1994 | Imahashi et al. | 429/33 |
| 5,470,680 A | | 11/1995 | Loutfy et al. | 429/218 |
| 6,589,312 B1 | * | 7/2003 | Snow et al. | 75/255 |
| 6,589,682 B1 | * | 7/2003 | Fleckner et al. | 429/34 |
| 6,635,377 B2 | * | 10/2003 | Hinokuma | 429/33 |
| 6,667,099 B1 | * | 12/2003 | Greiner et al. | 428/398 |
| 6,683,783 B1 | * | 1/2004 | Smalley et al. | 361/502 |
| 6,689,439 B2 | * | 2/2004 | Sobolewski | 428/36.9 |
| 6,706,431 B2 | * | 3/2004 | Kawamura et al. | 429/13 |
| 6,726,963 B2 | * | 4/2004 | Yamaura | 427/540 |

\* cited by examiner

*Primary Examiner*—Bruce F. Bell
(74) *Attorney, Agent, or Firm*—Bell, Boyd & Lloyd LLC

(57) ABSTRACT

A fuel cell that has a fuel electrode and an oxygen electrode facing each other with a proton conductor disposed therebetween is provided. The fuel electrode and the oxygen electrode can include current collectors containing carbon nano-tubes to facilitate the manufacture of the fuel cell and the performance thereof.

4 Claims, 8 Drawing Sheets

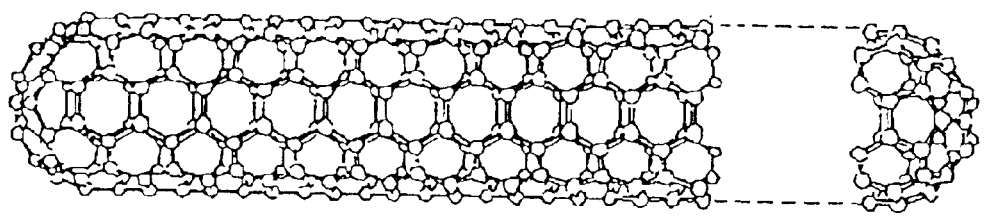
FIG.3A
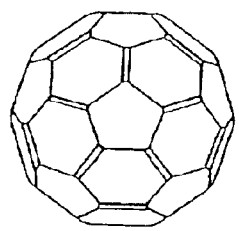   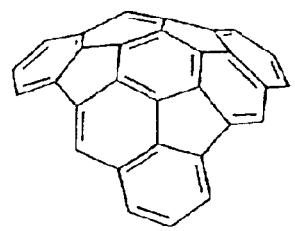
FIG.3B   FIG.3C

FUEL CELL

RELATED APPLICATION DATA

The present invention claims priority to Japanese Patent Application No. 2000-301411 filed on Sep. 29, 2000. The above-referenced Japanese Patent Documents is hereby incorporated by reference to the extent permitted by law.

BACKGROUND OF THE INVENTION

The invention relates to a fuel cell for producing an electromotive force by reaction of a fuel, such as hydrogen, with oxygen.

As the world's supply of fossil fuels is limited, there has been ongoing research directed toward alternative energy sources, including those that may be more environmentally friendly than traditional fossil fuels. A hydrogen gas fuel is one such example. Since hydrogen contains relatively large amounts of energy per unit weight and because it does not emit noxious gases or gases contributing to global warming, hydrogen may be an ideal energy source that is clean and moreover plentiful in supply.

Fuel cell technology involves the recovery of electrical energy from hydrogen. Fuel cell research is proceeding rapidly, with a variety of promising applications, such as large scale power generation, on-site self-generation of power, or as a power source for electric vehicles.

The fuel cell typically includes a fuel electrode, such as a hydrogen electrode, and an oxygen electrode, arranged on both sides of a proton conductor film. Supplying fuel (hydrogen) and oxygen to these electrodes induces a cell reaction that develops an electromotive force. In preparing the fuel cell, the proton conductor film, the fuel electrode and the oxygen electrode are routinely molded separately and bonded together.

However, in forming the fuel electrode and the oxygen electrode separately, a variety of inconveniences arise due to difficulties encountered in handling. For example, if the strength of the fuel electrode or the oxygen electrode is considered, a certain thickness is necessary (e.g., a thickness on the order of 100 $\mu$m or more). However, if the electrode thickness is increased, the efficiency of the cell reaction is lowered, thus lowering cell performance. If, in order to avoid this, the electrode thickness is decreased, the protein conductor film can be difficult to handle separate and apart from the electrodes due to its decreased size to compensate for the decreased size of the electrodes. Thus, this can significantly lower production yield.

SUMMARY OF THE INVENTION

It is therefore an advantage of the present invention to provide a fuel cell which is easy to manufacture and superior in cell performance. Applicants have discovered that a sheet or other suitable form of a material containing carbon nano-tubes or other suitable material can be of high strength and density such that it exhibits superior and desirable current collecting characteristics. Therefore, by utilizing this sheet of material as a current collector, a high performance fuel cell can be constructed.

In an embodiment, the present invention provides for a fuel cell having a fuel electrode and an oxygen electrode in which the fuel electrode and the oxygen electrode face each other with a proton conductor disposed in-between, wherein the fuel electrode and/or the oxygen electrode include a current collector containing carbon nano-tubes or other suitable materials or combinations thereof.

The current collector containing the carbon nano-tubes is high in strength and density and, in conjunction with the high electronic conductivity of the carbon nano-tubes, exhibits superior current collection. Moreover, by employing the current collector containing carbon nano-tubes, it becomes unnecessary to consider the mechanical strength of the fuel electrode or the oxygen electrode, and hence these electrodes can be reduced in thickness. The result is that, in the fuel cell of the present invention, the cell reaction can occur efficiently to improve cell performance.

Additional features and advantages of the present invention are described in, and will be apparent from, the following Detailed Description of the Invention and the figures.

BRIEF DESCRIPTION OF THE FIGURES

FIGS. 3A to 3C are schematic views showing a variety of carbonaceous materials contained in carbon soot prepared on arc discharge according to an embodiment of the present invention.

DETAILED DESCRIPTION OF THE INVENTION

Figure 1:
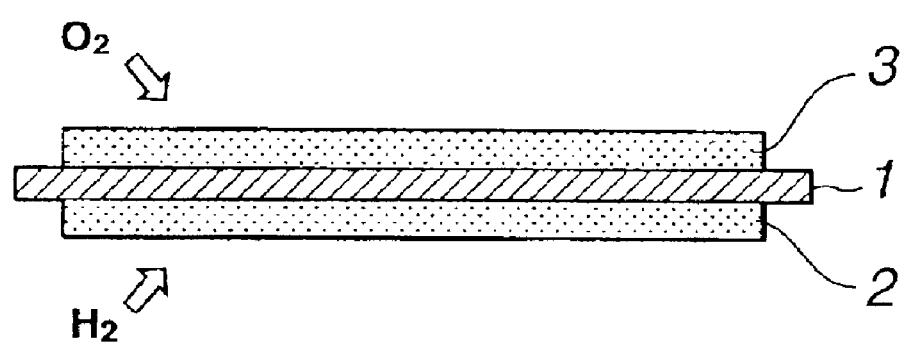
FIG. 1 is a schematic cross-sectional view showing a fuel cell according to an embodiment of the present invention.

Referring to the drawings, a fuel cell according to the present invention will be explained in detail.

In general, the fuel cell includes a proton conductor film 1 exhibiting proton conductivity, and a fuel electrode 2 and an oxygen electrode 3 formed on respective surfaces of the proton conductor film 1.

If hydrogen, for example, is supplied to the fuel electrode 2, while oxygen is supplied to the oxygen electrode 3, cell reaction occurs to produce an electromotive force. In the case of a so-called direct methanol system, methanol may also be supplied as a hydrogen source to the fuel electrode 2.

In an embodiment of the present invention, a sheet or other suitable form of a material including carbon nano-tubes can be used as a current collector for a fuel electrode 2 and for an oxygen electrode 3. The carbon nano-tubes are in the form of elongated fibers ranging from about 1 nm to about 3 nm in diameter and about 1 $\mu$m to about 14 $\mu$m in length. When shaped into a sheet, or other suitable form the carbon nano-tubes are entangled or combined together to develop a high strength material despite the reduced thickness of the sheet.

Moreover, the carbon nano-tubes are of extremely high electronic conductivity so that the sheet of material exhibits superior characteristics as a current collector. For example, the sheet of the carbon nano-tubes has an electrical resistance not larger than one-half that of the typical carbon sheet, therefore by using the carbon nano-tubes as the electrode current collector of the fuel cell, it is possible to raise the output voltage as well as to make efficient use of the cell energy. Other beneficial properties of the carbon nano-tubes include being lightweight, relatively resistant to acid and low in production cost also exist.

Figure 2:
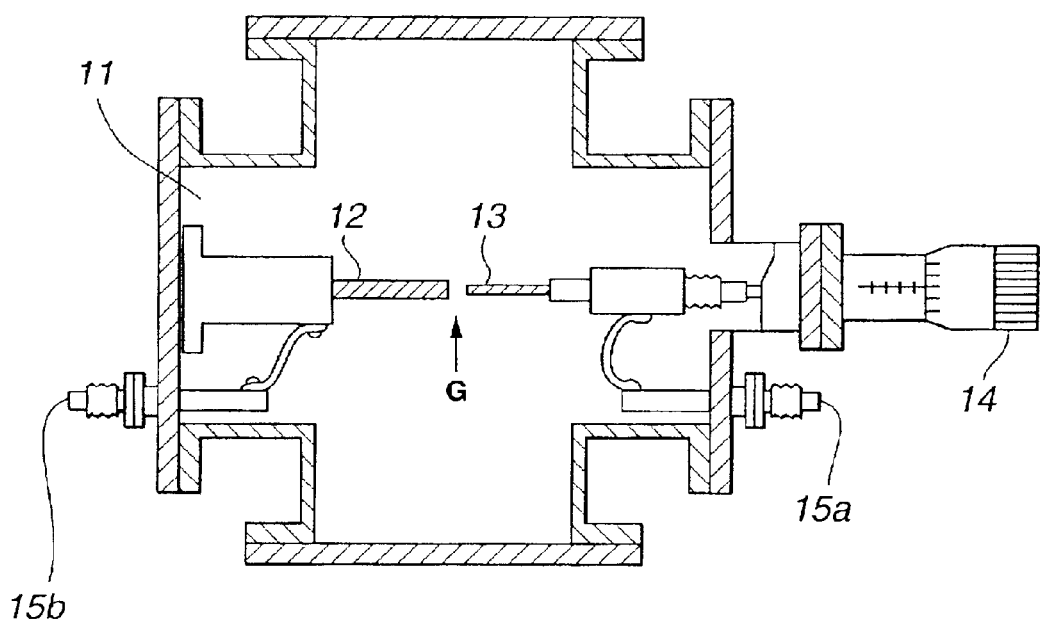
FIG. 2 is a schematic view showing an arc discharge device used for the preparation of a carbon nano-tube according to an embodiment of the present invention.

FIG. 2 shows a typical arc discharge device used for the preparation of a carbonaceous material including carbon nano-tubes in an embodiment of the present invention. In the present apparatus, a negative electrode 12 and a positive electrode 13, both composed of rods of carbon, such as graphite, are arranged facing each other with a gap G in-between within a reaction chamber 11, such as a vacuum chamber. The rear end of the positive electrode 13 is connected to a linear movement introducing mechanism 14. The electrodes 13 and 12 are connected to current introducing terminals 15a and 15b, respectively.

If, in the above arrangement, the inside of the reaction chamber 11 is evacuated and subsequently charged with rare gases, such as helium, and the DC current is supplied to the respective electrodes, an arc discharge is produced across the negative electrode 12 and the positive electrode 13. Thus, a soot-like carbonaceous material is deposited on the inner surface of the reaction chamber 11 and on the negative electrode 12. In an embodiment, if a small-sized vessel, or other suitable vessel is attached, for example to the sidewall surface or other suitable surface, the soot also can be deposited therein.

In the soot-like carbonaceous material recovered from the reaction chamber 11, there are carbon nano-tubes (shown in FIG. 3A), $C_{60}$ fullerene (shown in FIG. 3B), $C_{70}$ fullerene (not shown), carbon soot (shown in FIG. 3C) or other suitable materials and combinations thereof. These carbon soot molecules have a curvature which obstruct the growth of the soot molecules into fullerene molecules or carbon nano-tubes. By way of a typical composition, this soot-like carbonaceous material may be composed of 10 to 20% fullerene, such as $C_{60}$ or $C_{70}$ and a small percentage of carbon nano-tubes, with the balance being a large quantity of the carbon soot. It should be appreciated that any suitable amount and types of materials can be utilized.

In the above-described carbonaceous material, 20 wt % or less of a metal having a catalytic action of separating a hydrogen molecule into a hydrogen atom and further to a proton and an electron may preferably be added by any suitable known method on at least a portion of the surface of the carbonaceous material. In an embodiment, the metal exhibiting a catalytic action can include, for example, platinum, platinum alloys, like materials or combinations thereof. If such metal is added as described above, the efficiency of the cell reaction can be higher than otherwise.

Any suitable material exhibiting protonic conductivity may be used as the proton conductor film 1. For example, a proton conducting material may be applied to a separator for use as the proton conductor film 1. Specifically, the materials usable as the proton conductor film 1 may include a polymer material capable of conducting protons (hydrogen ions), such as perfluorosulfonic acid resin, for example, Nafion(R) manufactured by Du Pont SA.

Other proton conductor materials can include polymolybdenic acids or oxides having a large number of hydrates, such as $H_3Mo_{12}PO_{40}\cdot 29H_2O$ or $Sb_2O_5\cdot 5.4H_2O$. If placed under wet conditions, these high molecular weight materials can exhibit high proton conductivity at or near ambient temperature.

Taking the perfluorosulfonic acid resin as an example, protons electrically dissociated from the sulfonic acid group are bound with moisture taken in large quantities into the high molecular weight matrix by a hydrogen bond to generate protonated water, that is, oxonium ions ($H_3O^+$). Such protons can smoothly migrate in the matrix in the form of these oxonium ions. Consequently, this type of the matrix material can exhibit appreciably high proton conductivity even at or near ambient temperature.

Alternatively, a proton conductor having a conduction mechanism different from that of the aforementioned materials may also be used. These alternative materials are composite metal oxides having a perovskite structure, such as Yb-doped $SrCeO_3$. These composite metal oxides having a perovskite structure have been found to exhibit protonic conductivity without needing moisture as the medium for migration. In these composite metal oxides, the protons are thought to be conducted by channeling themselves through oxygen ions forming the skeleton of the perovskite structure.

A proton conductor composed of a carbonaceous material that forms a matrix structure and having proton dissociative groups introduced therein, may be used for the material forming the proton conductor 5. Proton dissociative groups are functional groups from which protons ($H^+$) may be detached by ionic dissociation. In an embodiment, the proton dissociative groups can include, for example, —OH, —OSO$_3$H, —SO$_3$H, —COOH, —OP(OH)$_2$, the like and combinations thereof. In this regard, protons are migrated through the proton dissociative groups to manifest ion conductivity.

Any suitable material, for example, a material mainly composed of carbon, may be used. It is, however, preferable that ion conductivity be relatively high and electronic conductivity be low after introducing the proton dissociative groups. In an embodiment, a carbon cluster, as an aggregate of carbon atoms, or tubular carbon materials, typically including carbon nano-tubes, can be used as the carbonaceous material. Among a variety of carbon clusters, fullerene, a fullerene structure having an opening end at least at a portion thereof, or a diamond structure, is preferred.

A cluster typically means an aggregate of several to hundreds of atoms, bound or flocculated together. If these atoms are carbon atoms, such flocculation or aggregation improves proton conductivity while simultaneously holding chemical properties to provide for sufficient film strength and for ease in forming layers. A cluster mainly composed of carbon is an aggregate of several to hundreds of carbon atoms regardless of the type of the carbon-carbon bonds. Such clusters may, however, not be composed only of carbon atoms, such that other atoms may be present with the carbon atoms. Thus, an aggregate of atoms, the major portion of which is composed of carbon atoms, is termed a carbon cluster. Examples of these aggregates are shown in FIGS. 4 to 7 in which the proton dissociative groups are omitted. It may be seen that there is wide latitude for selection of types of proton conducting materials.

Figure 4:
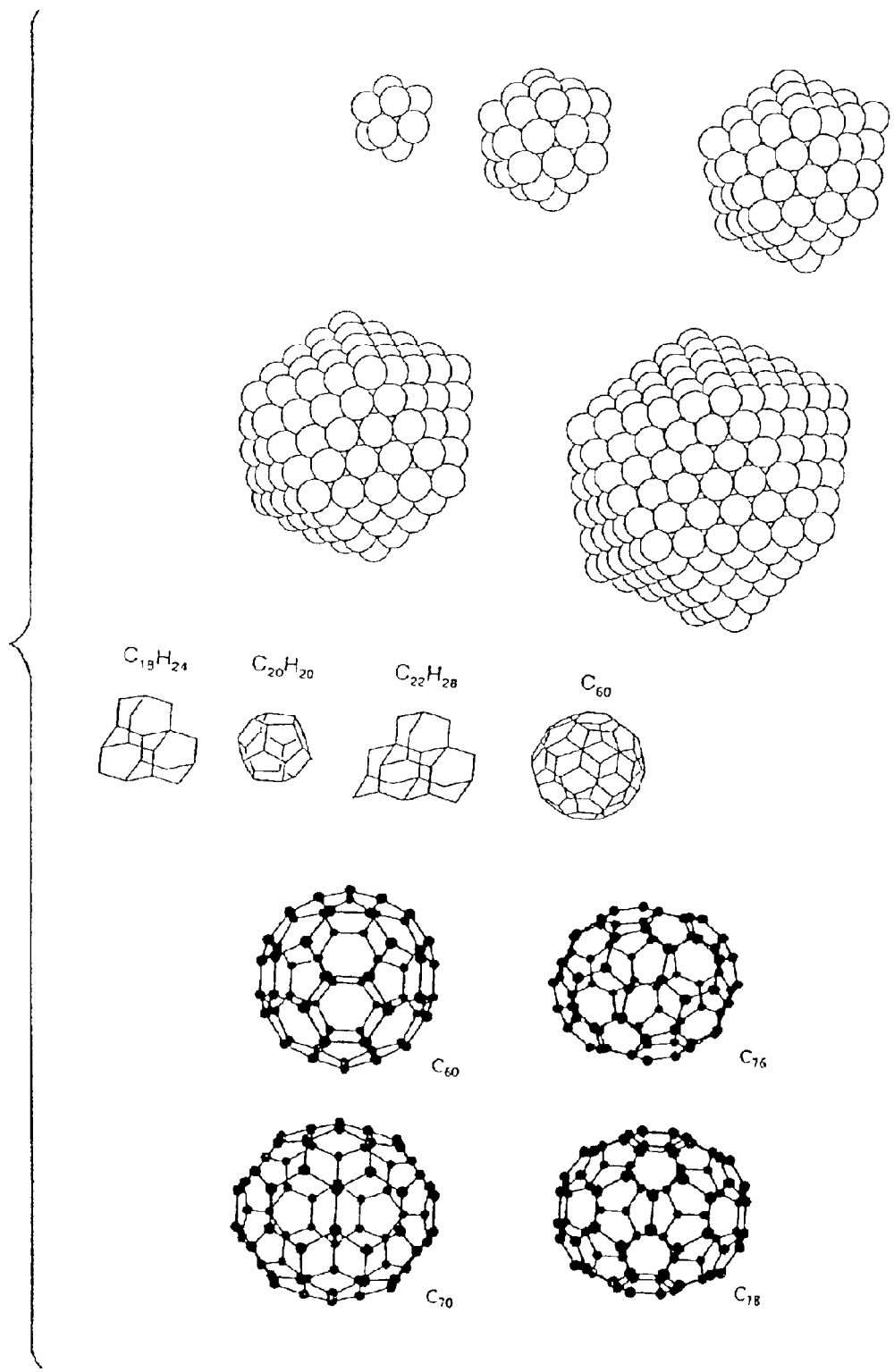
FIG. 4 is a schematic view showing various examples of a carbon cluster according to an embodiment.
Figure 5:
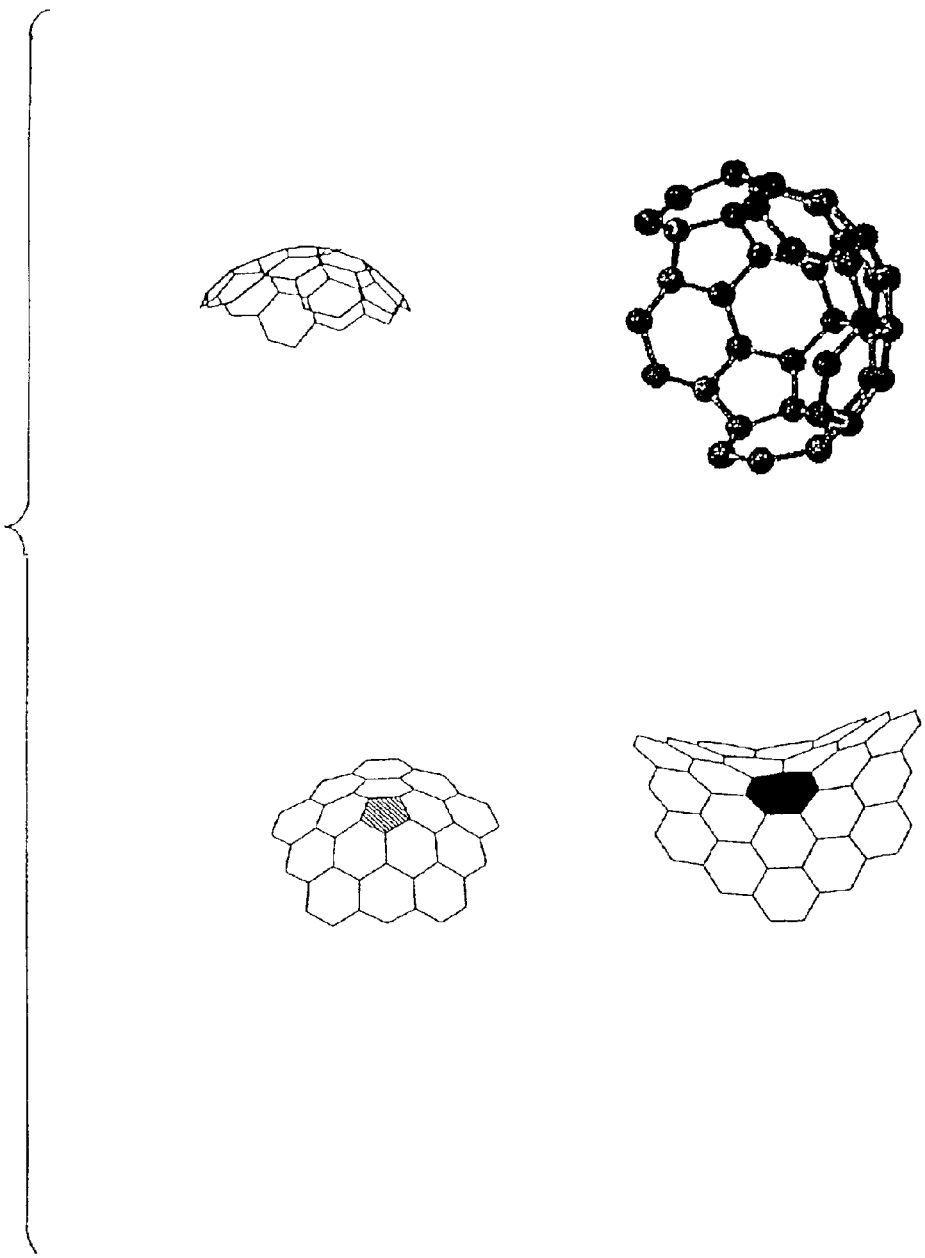
FIG. 5 is a schematic view showing another example of a carbon cluster (e.g., of the present invention partial fullerene structure) according to an embodiment of the present invention.
Figure 6:
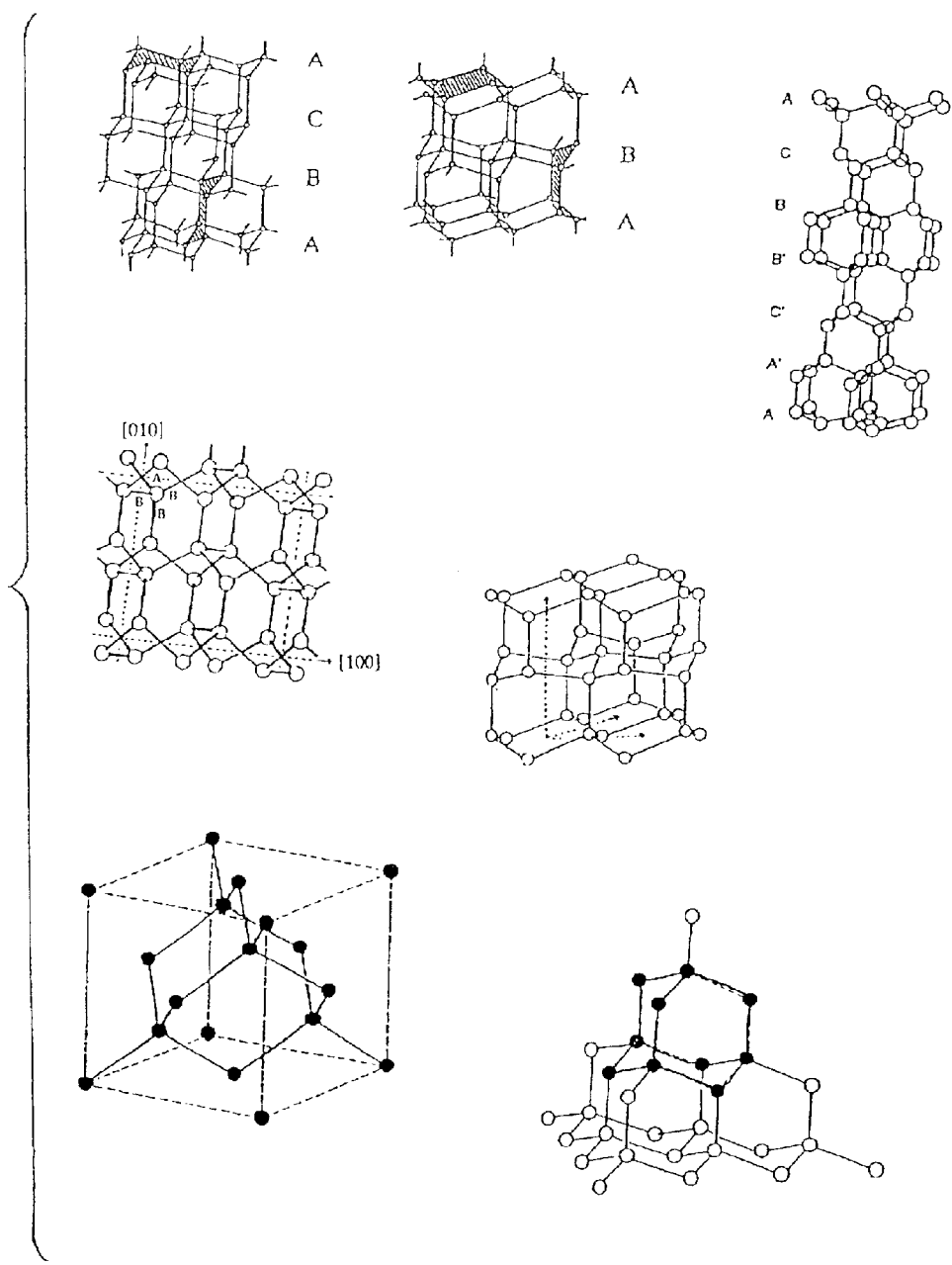
FIG. 6 is a schematic view showing still another example of a carbon cluster (diamond structure) according to an embodiment of the present invention.

FIG. 4 shows a variety of carbon clusters, each composed of a large number of carbon atoms and each having the structure of a closed surface similar to that of a sphere, an elongated ball and the like. In FIG. 5, molecular fullerenes are also shown. FIG. 5 shows a variety of carbon clusters, the spherical structures of which are partially interrupted. These types of the carbon clusters feature open ends in the structures. A large number of such structures may be seen as by-products of the fullerene manufacturing process, for example, by arc discharge. If the major portion of the carbon atoms of the carbon cluster are bound in an $Sp^3$ bond, a diamond structure can be produced, such as is shown in the structure of the various clusters in FIG. 6.

Figure 7:
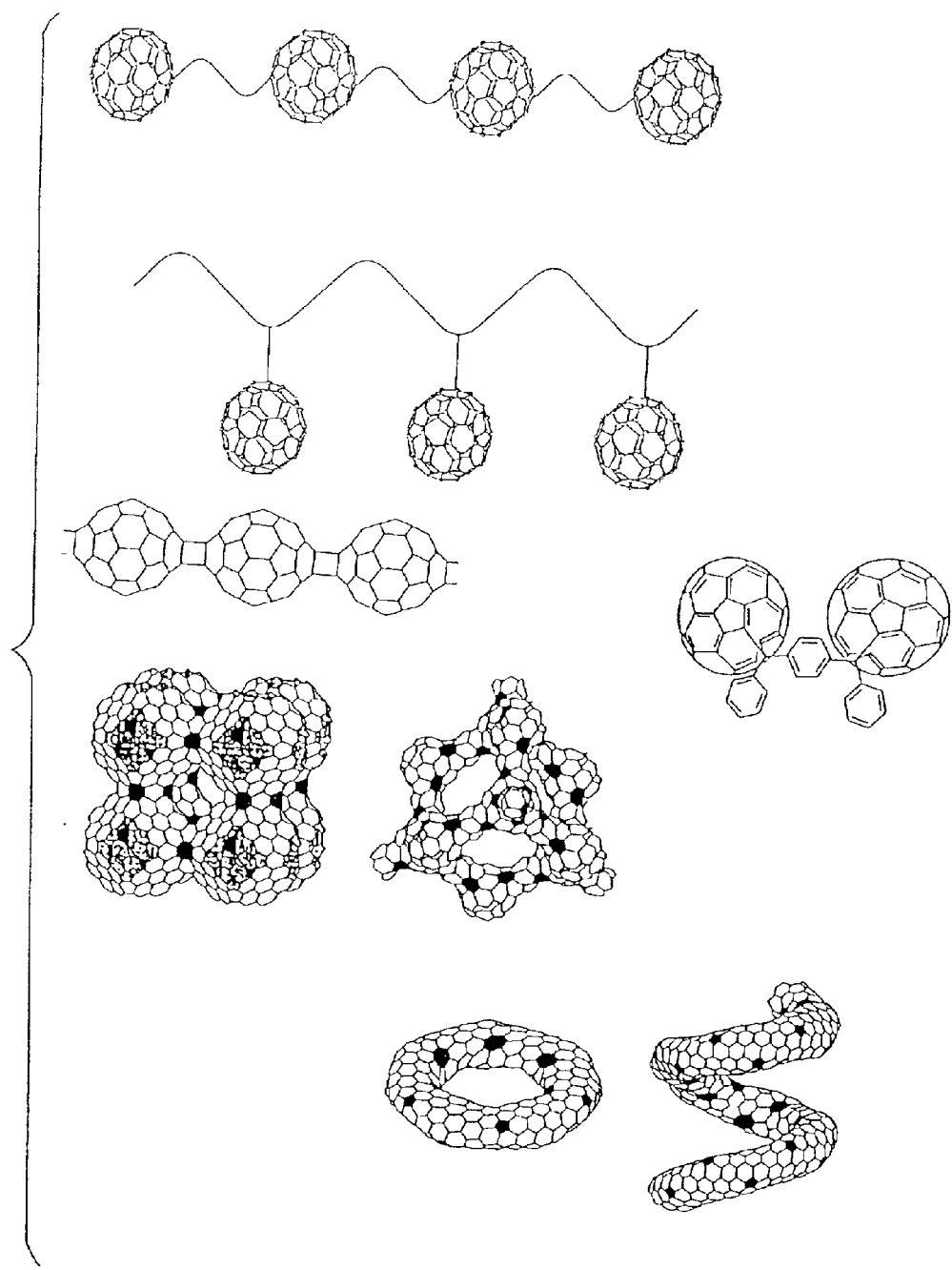
FIG. 7 is a schematic view showing yet another example of a carbon cluster (e.g., clusters bonded together) according to an embodiment of the present invention.

FIG. 7 shows several examples of different clusters that are bound together. The present invention may be applied to this type of structure.

In the proton conductor containing, as main component, the aforementioned carbonaceous material having proton dissociative groups, protons tend to be dissociated from the groups, even under dry conditions. Moreover, these protons are able to exhibit high conductivity over a wide temperature range including ambient temperatures, such as a temperature that ranges from at least about 160° C. to about −40° C. Although this proton conductor can exhibit sufficient proton conductivity even in a dry state, the presence of moisture may be tolerated. Such moisture may be that intruded from outside the fuel cell due to environmental conditions.

Figure 8:
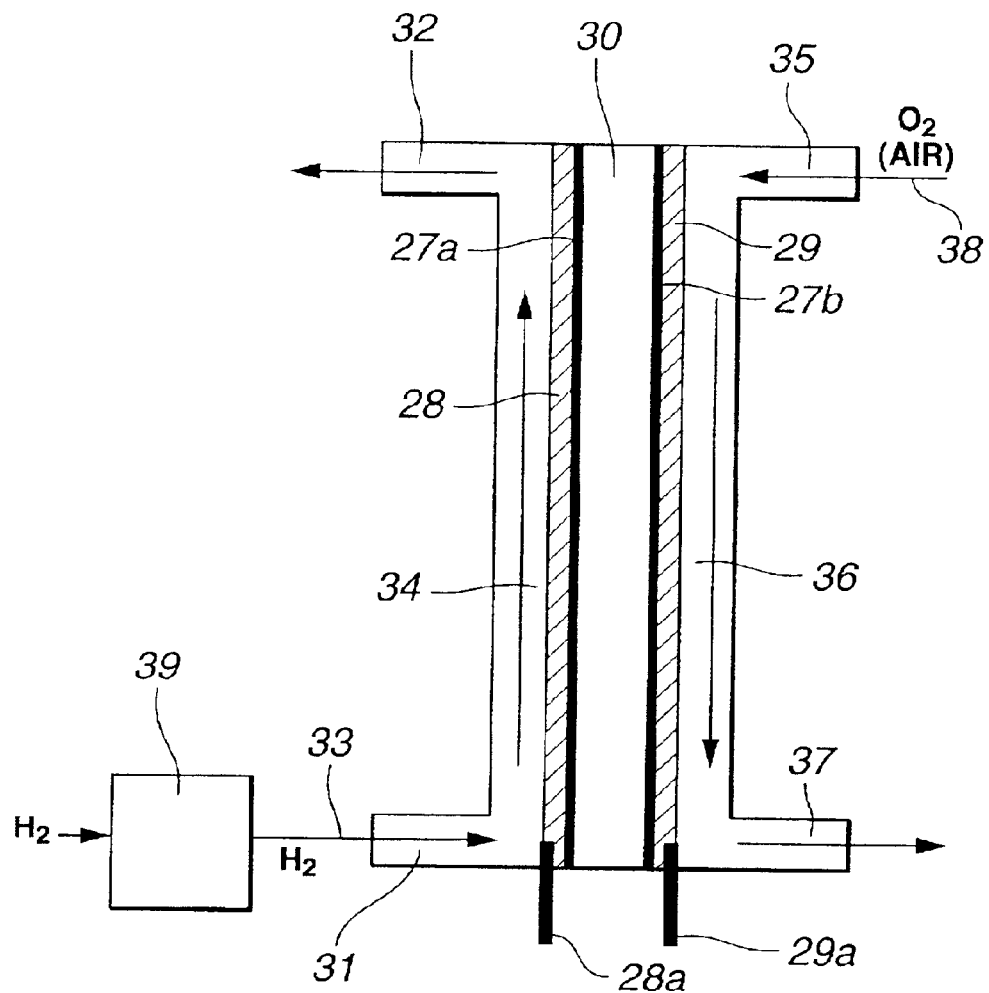
FIG. 8 is a schematic view showing a fuel cell according to an embodiment of the present invention.

FIG. 8 shows a specified illustrative structure of a fuel cell into which are assembled the aforementioned electrodes and the proton conductor. This fuel cell includes a negative electrode (fuel electrode or hydrogen electrode) 28 and a positive electrode (oxygen electrode) 29, having catalysts 27a and 27b intimately bonded thereto or scattered therein, and a proton conductor unit 30 between these electrodes. From the negative electrode 28 and the positive electrode 29 are derived terminals 28a 29a for connection to external circuitry.

In this fuel cell, hydrogen is supplied in use via an inlet 31 on the side of negative electrode 28 so as to be discharged via outlet 32, which may optionally be omitted. As the fuel (hydrogen) traverses a channel 34, protons are generated and migrated along with protons generated in the proton conductor unit 30 towards the positive electrode 29 where they are reacted with oxygen (air) supplied via inlet 35 to the channel 36 to flow towards the outlet 37 to recover the desired electromotive force.

In the above-described arrangement, a hydrogen occlusive alloy or a carbonaceous material for hydrogen occlusion other like material can be stored in a hydrogen supply source 39. This material may also have hydrogen occluded therein at the outset so as to be accommodated in this state in the hydrogen supply source 39.

EXAMPLE 1

1 wt % of carbon nano-tubes (produced on arc discharge; 96% purity) was added to activated charcoal powder having a surface area of 1000 m/g. Using a water-soluble platinum compound, such as $H_2PtCl_6$ 20 wt % of fine particles of platinum were deposited by a chemical deposition method on the activated charcoal surface. After mixing, 15 wt % of Nafion (Aldrich) based on the weight of the platinum carrying carbon were mixed and rendered ink-like. This ink-like product was coated by a spin coating method on a Nafion film (Nafion 117). After drying, the coating thickness was measured with a film thickness gauge.

The current collecting characteristics of the electrode were evaluated by measuring the specific resistance of the electrode surface by a four terminal method. Output characteristics were measured by a current value on applying a voltage of 0.6 V. Dry hydrogen was caused to flow to the fuel electrode at a rate of 50 ml/min, while humidified oxygen was caused to flow to the oxygen electrode at a rate of 50 ml/min. The voltage of 0.6 V was used because the working voltage of commercially available portable equipment is based on 1.2 V.

EXAMPLE 2

An electrode similar to that of Example 1 was prepared and evaluated in the same way as in Example 1 except that the carbon nano-tube mixing ratio was 20 wt %.

EXAMPLE 3

An electrode similar to that of Example 1 was prepared and evaluated in the same way as in Example 1 except that the carbon nano-tube mixing ratio was 40 wt %.

EXAMPLE 4

An electrode similar to that of Example 1 was prepared and evaluated in the same way as in Example 1 except that the carbon nano-tube mixing ratio was 60 wt %.

EXAMPLE 5

An electrode similar to that of Example 1 was prepared and evaluated in the same way as in Example 1 except that the carbon nano-tube mixing ratio was 80 wt %.

EXAMPLE 6

An electrode similar to that of Example 1 was prepared and evaluated in the same way as in Example 1 except that the carbon nano-tube mixing ratio was 20 wt %.

Comparative Example 1

An electrode similar to that of Example I was prepared and evaluated in the same way as in Example 1 except that the carbon nano-tube mixing ratio was 0 wt %.

TABLE

Correlation between Carbon Nano-Tube Content and Fuel Cell Characteristics

| | Carbon nano-tube content (wt %) | current density (mA/cm$^2$) | specific resistance (Ω cm) |
|---|---|---|---|
| Ex. 1 | 1 | 480 | 8.0 |
| Ex. 2 | 20 | 600 | 6.0 |
| Ex. 3 | 40 | 750 | 4.0 |
| Ex. 4 | 60 | 880 | 2.0 |
| Ex. 5 | 80 | 1100 | 1.1 |
| Ex. 6 | 100 | 1450 | 0.4 |
| Comp. Ex. 1 | 0 | 200 | 18.0 |

As demonstrated above, Table 1 illustrates that the fuel cell characteristics can be enhanced by the use of carbon nano-tubes and increasing amounts thereof.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

What is claimed is:

1. A fuel cell comprising:
a fuel electrode, an oxygen electrode and a material capable of conducting protons disposed between the fuel electrode and the oxygen electrode wherein at least one of the fuel electrode and the oxygen electrode includes a current collector that contains a current collector material composed of carbon nano-tubes.

2. The fuel cell according to claim 1, wherein the at least one of the fuel electrode and the oxygen electrode comprises a catalyst material having a metal component.

3. The fuel cell according to claim 2, wherein the metal component is selected from the group consisting of platinum, platinum alloy and mixtures thereof.

4. The fuel cell according to claim 1, wherein the material capable of conducting protons comprises a carbonaceous material substantially composed of carbon defining a matrix structure that has one or more proton dissociative groups introduced therein.

* * * * *